US006509920B2

(12) United States Patent
Sung et al.

(10) Patent No.: US 6,509,920 B2
(45) Date of Patent: Jan. 21, 2003

(54) INK RIBBON POSITIONING SYSTEM OF A COLOR PRINTER

(75) Inventors: Li-Fu Sung, San-Chung (TW); Yung-Yi Li, Yung-Kang (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/116,073

(22) Filed: Apr. 5, 2002

(65) Prior Publication Data

US 2002/0158957 A1 Oct. 31, 2002

Related U.S. Application Data

(63) Continuation of application No. 09/630,527, filed on Aug. 1, 2000, now Pat. No. 9,639,526.

(30) Foreign Application Priority Data

Oct. 14, 1999 (TW) .................................... 088117819 A

(51) Int. Cl.[7] ............................. B41J 35/18; G01J 3/50
(52) U.S. Cl. ...................................................... 347/178
(58) Field of Search ......................... 347/178; 356/425; 400/240.3

(56) References Cited

U.S. PATENT DOCUMENTS 4,710,781 A * 12/1987 Stephenson ................. 347/178
RE33,260 E * 7/1990 Stephenson ................. 347/178
5,037,218 A * 8/1991 Shimizu et al. ............. 400/237
5,751,601 A * 5/1998 Tang et al. ................. 347/178
6,071,024 A * 6/2000 Chi-Ming et al. ..... 400/120.02
6,396,526 B1 * 5/2002 Sung et al. ................. 347/178

FOREIGN PATENT DOCUMENTS

| | | | | |
|---|---|---|---|---|
| JP | 60-154093 | * | 8/1985 | ............ B41J/35/18 |
| JP | 63-41177 | * | 2/1988 | ............ B41J/35/18 |
| JP | 11-180016 | * | 7/1999 | ............. G01J/3/50 |

* cited by examiner

*Primary Examiner*—Huan Tran
(74) *Attorney, Agent, or Firm*—Winston Hsu

(57) ABSTRACT

An ink ribbon positioning system of a color printer for identifying various positions of a color ink ribbon of the color printer. The ink ribbon includes a plurality of sequentially arranged color frames for storing different color dyes. The color printer includes a thermal print head for printing the color dyes onto an object. The ink ribbon positioning system includes first and second light sources for emitting light beams through the ink ribbon, an optical sensor for detecting the light beams penetrating through the ink ribbon, and an identification device electrically connected to the first and the second light sources. When the ink ribbon scrolls relative to the thermal print head, the identification device will control the first and the second light sources and identify the position of each of the color frames of the ink ribbon according to an output voltage generated by the optical sensor.

12 Claims, 9 Drawing Sheets

INK RIBBON POSITIONING SYSTEM OF A COLOR PRINTER

This application is a continuation of applicant's earlier application, Ser. No. 09/630,527, filed Aug. 1, 2000 now U.S. Pat. 9,639,526.

BACKGROUND OF THE INVENTION

1. Field of the Invention

The invention relates to an ink ribbon positioning system, and more particularly, to an ink ribbon positioning system for identifying various positions of a color ink ribbon of a color printer, such as a thermal printer.

2. Description of the Prior Art

Please refer to FIG. 1. FIG. 1 is a perspective view of a prior art ink ribbon positioning system 10. The ink ribbon positioning system 10 is used for identifying the position of a color ink ribbon 11 of a color printer (not shown). The ink ribbon 11 comprises a plurality of sequentially arranged transparent color frames 14, 16, 18 for storing yellow, magenta, and cyan dyes. The ink ribbon 11 further comprises a plurality of sequentially arranged strip areas 20, 22, 24 separately installed next to each of the color frames 14, 16, 18. The strip area 20 is an opaque area installed between the yellow and cyan color frames 14, 18. The strip area 22 has a top transparent portion and a bottom opaque portion and is installed between the yellow and magenta color frames 14, 16. The strip area 24 also has a top transparent portion and a bottom opaque portion and is installed between the magenta and cyan color frames 16, 18.

The ink ribbon positioning system 10 further comprises two light sources 26, 28 arranged along the way perpendicular to scrolling direction on one side of the ink ribbon 11, and two corresponding sensors 30, 32 installed on another side of the ink ribbon 11. The position of the ink ribbon 11 is identified through the strip areas 20, 22, 24. The detection of the strip area 20 by the sensors 30, 32 corresponds to the beginning of a new yellow color frame 14 of the ink ribbon 11. The detection of the partially opaque area 22 or 24 by the sensors 30, 32 corresponds to the beginning of the magenta or cyan color frame 16, 18 of the ink ribbon 11. Because the ink ribbon positioning system 10 is installed with two sets of light sources 26, 28 and sensors 30, 32 for detecting the position of the ink ribbon 11, it's production cost is very high. In addition, the light sources 26, 28 must be always on together so that the position of the ink ribbon 11 can be detected by the sensors 30, 32. This makes the system not very flexible.

SUMMARY OF THE INVENTION

It is therefore a primary objective of the present invention to provide an ink ribbon positioning system to solve the above mentioned problem.

Briefly, in a preferred embodiment, the present invention provides an ink ribbon positioning system of a color printer for identifying various positions of a color ink ribbon of the color printer. The ink ribbon comprises a plurality of sequentially arranged color frames for storing different color dyes. The color printer comprises a thermal print head for printing the color dyes onto an object and a driving device for scrolling the ink ribbon relative to the thermal print head. The ink ribbon positioning system comprises:

a first light source for emitting a first light beam through the ink ribbon;

a second light source for emitting a second light beam through the ink ribbon;

an optical sensor for detecting the first and second light beams penetrating through the ink ribbon and generating an output voltage; and an identification device electrically connected to the first and the second light sources;

wherein when the driving device scrolls the ink ribbon relative to the thermal print head, the identification device will control the first and the second light sources and identify the position of each of the color frames of the ink ribbon according to the output voltage generated by the optical sensor.

It is an advantage of the present invention that the ink ribbon positioning system only comprises one optical sensor. Thus, the number of components of the color printer is reduced and the production cost is lowered. In addition, it is not necessary for the light sources to be always on together. This substantially makes the system flexible.

These and other objectives and advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
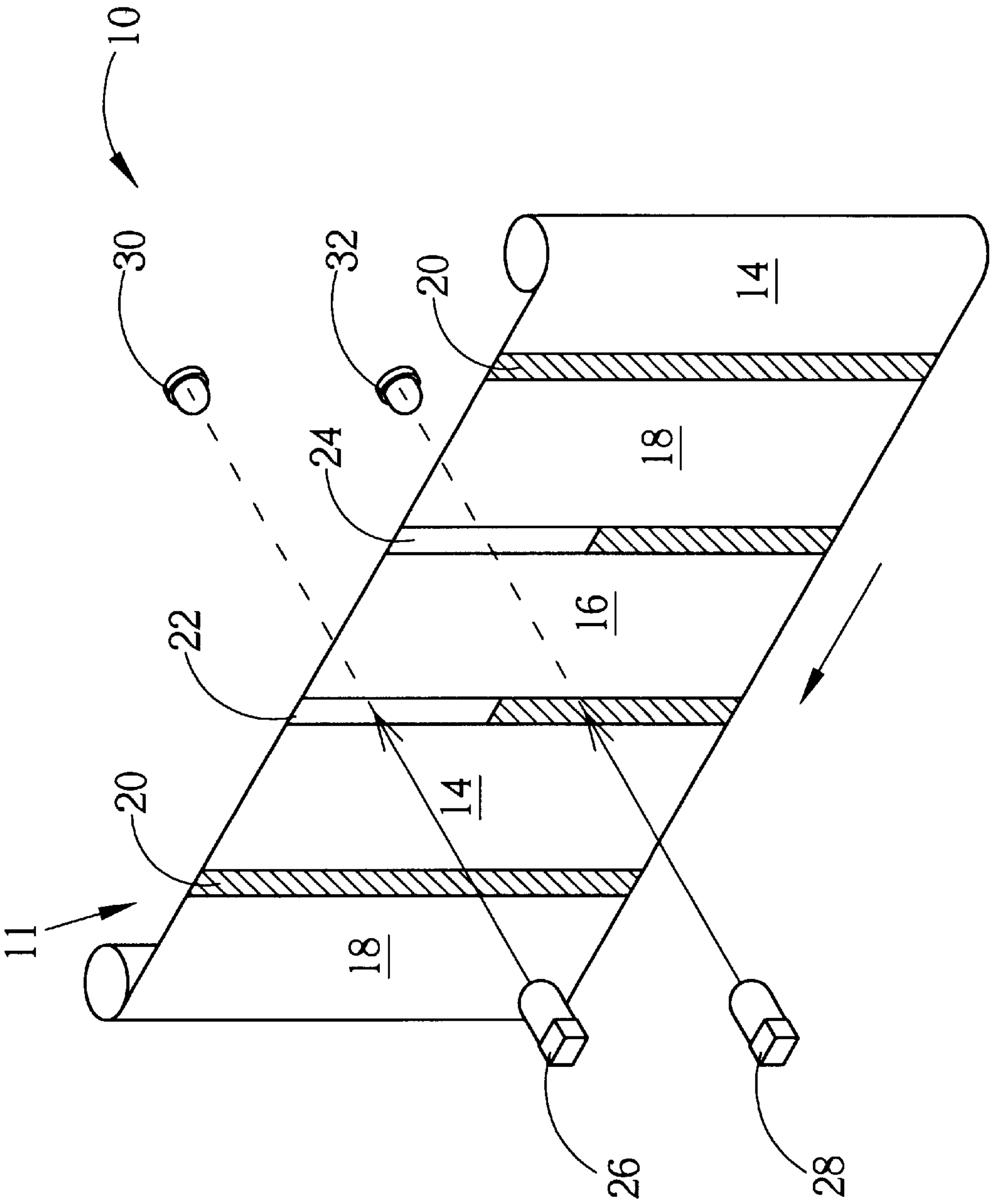
Fig. 1 Prior art
FIG. 1 is a perspective view of a prior art ink ribbon positioning system.
Figure 2:
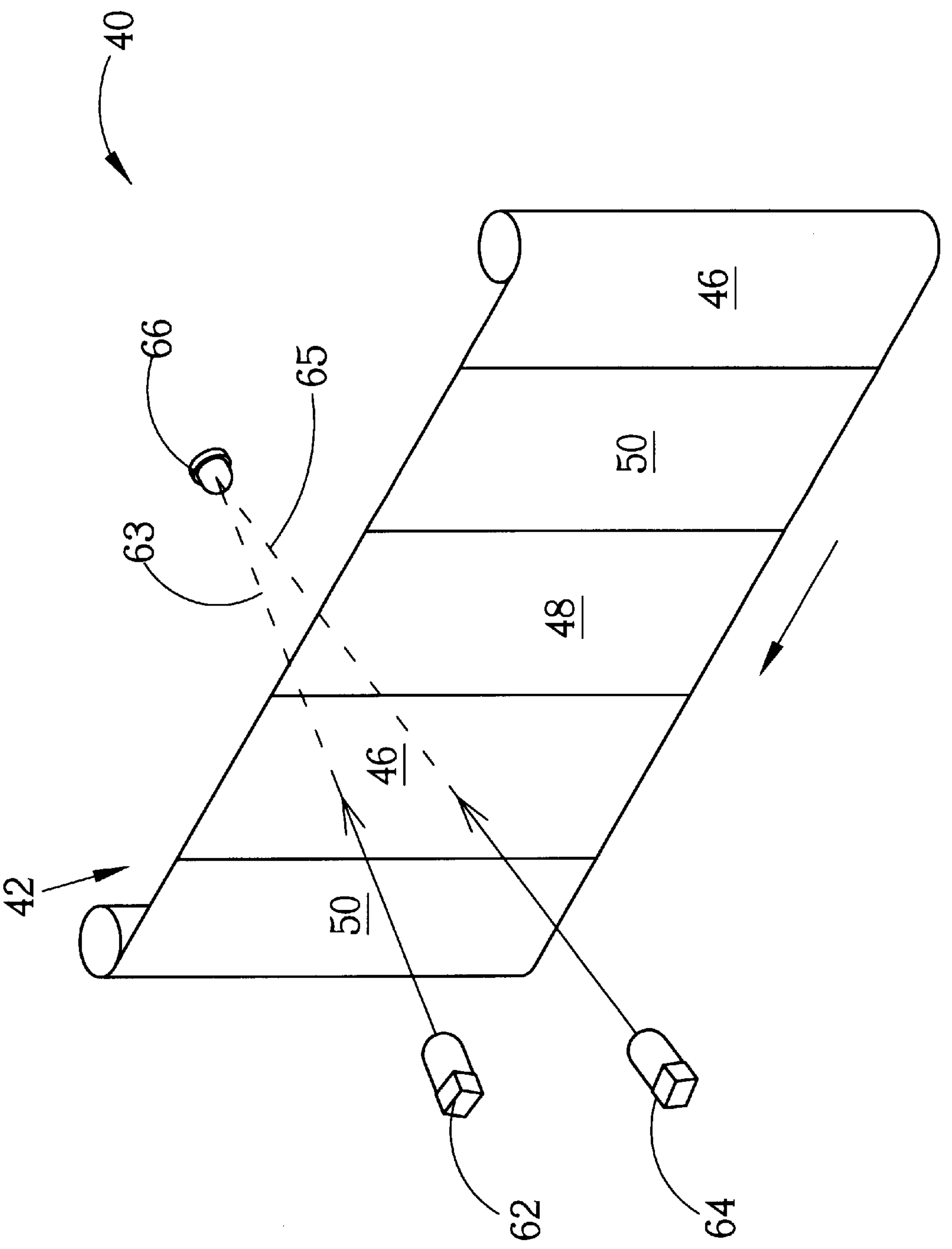
FIG. 2 is a perspective view of an ink ribbon positioning system according to the present invention.
Figure 3:
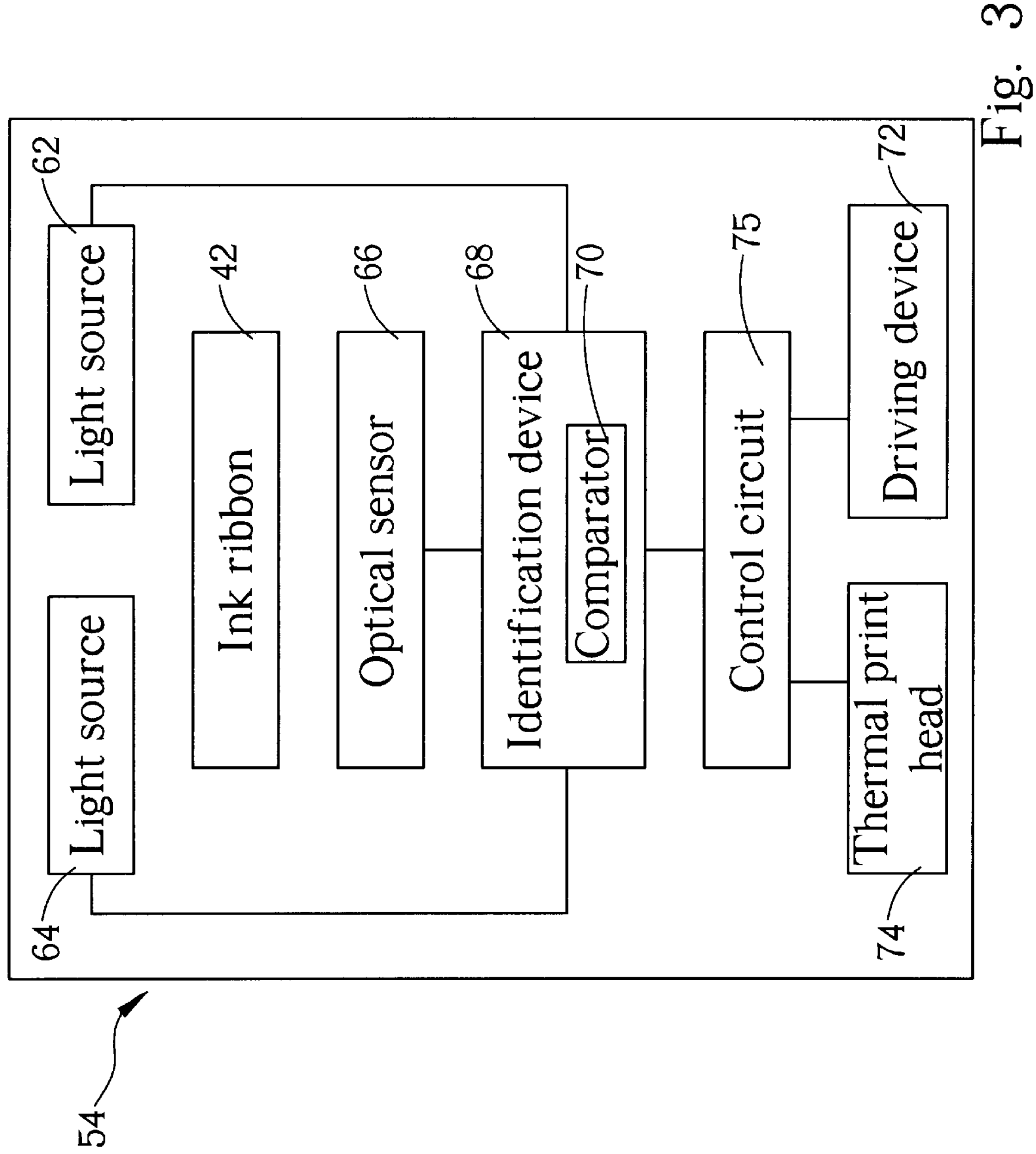
FIG. 3 is a block diagram of a present invention color printer.

Please refer to FIGS. 2 and 3. FIG. 2 is a perspective view of an ink ribbon positioning system 40 according to the present invention. FIG. 3 is a functional block diagram of a present invention color printer 54. The ink ribbon positioning system 40 is used to identify the position of a color ink ribbon 42 of the color printer 54. The ink ribbon 42 comprises a plurality of sequentially arranged color frames 46, 48, 50 for separately storing yellow, magenta, and cyan dyes.

The color printer 54 comprises a thermal print head 74 that uses the color dyes stored in the color frames to form color images onto the receiver. It also comprises a driving device 72 for scrolling the ink ribbon 42 related to the thermal print head 74.

The ink ribbon positioning system 40 comprises a green light source 62 and a red light source 64 installed on one side of the ink ribbon 42, an optical sensor 66 installed on the opposite side of the ink ribbon 42, and an identification device 68 electrically connected to the two light sources 62, 64 and the optical sensor 66. The two light sources 62, 64 emit two light beams 63, 65 of different colors towards the ink ribbon 42. The optical sensor 66 (photosensor) detects the two light beams 63, 65 that pass through the ink ribbon 42 and generates a corresponding output voltage. The identification device 68 will control the state (on or off) of the two light sources 62, 64, and thereby identify the current position of the color frames of the ink ribbon 42 by the output voltage generated by the optical sensor 66. The identification device 68 will then generate the corresponding position signal. The two light beams 63, 65 emitted by the two light sources 62, 64 have different penetration rates for the three color frames 46, 48, 50. Therefore, when the color frames pass by the optical sensor 66, the optical sensor 66 will generate different output voltages according to which color frame is in front of the optical sensor 66 and the states of the two light sources 62, 64. The identification device 68 comprises a comparator 70. The comparator 70 compares the output voltages induced by the optical sensor 66 with a threshold voltage which is defined to identify the state during the ribbon positioning process, and generates comparison signals. Then the identification device 68 identifies the position of the color frames of the ink ribbon 42 according to these comparison signals, and generates the corresponding position signals offering to the control circuit 75.

Figure 4:
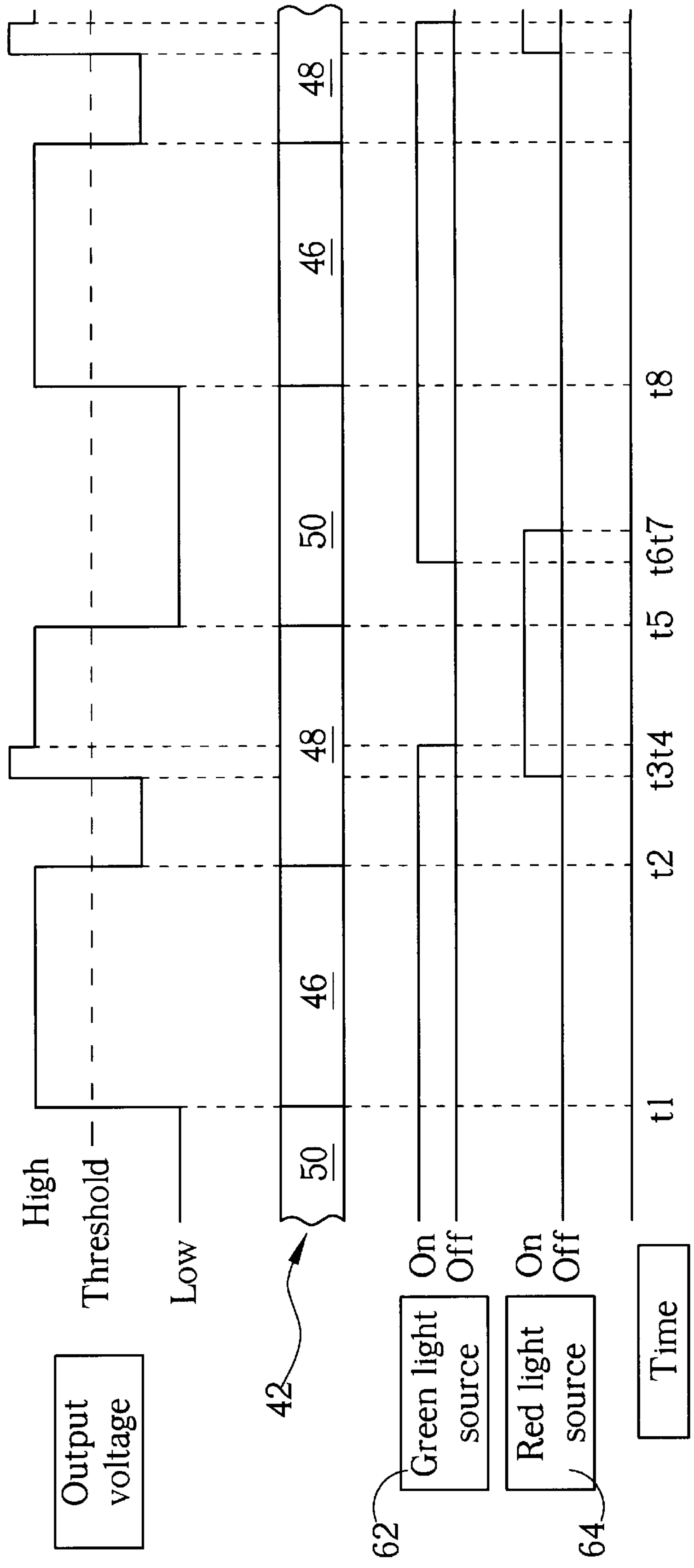
FIG. 4 is a time sequence diagram of the ink ribbon positioning system shown in FIG. 2.

Please refer to FIG. 4. FIG. 4 is a time sequence diagram of the ink ribbon positioning system 40 shown in FIG. 2. When the ink ribbon 42 is scrolled along a predetermined direction by the driving device 72, the identification device 68 will compare the output voltage generated by the optical sensor 66 with a threshold voltage to identify the position of the color frames of the ink ribbon 42. Green light has a higher penetration rate for the yellow color frame 46 and a lower one for the magenta and cyan color frames 48, 50. Hence, the light beam 63 through the ink ribbon 42 emitted by the green light source 62 can be used by the identification device 68 to identify the position of the yellow color frame 46 and the following magenta color frame 48. Similarly, since red light has a higher penetration rate for the yellow and magenta color frames 46, 48 and a lower one for the cyan color frame 50, the light beam 65 through the ink ribbon 42 emitted by the red light source 64 can be used by the identification device 68 to identify the position of the magenta color frame 48 and the following cyan color frame 50. When the identification device 68 has identified the position of the yellow color frame 46, the identification device 68 will keep the green light source 62 ON and the red light source 64 OFF. Thus, only the green light beam 63 penetrates through the ink ribbon 42, and the identification device 68 can identify the position of the magenta color frame 48 that follows the yellow color frame 46 by comparing the output voltage of the optical sensor 66 to the threshold voltage. From this comparison, the identification device 68 generates the corresponding position signal. When the identification device 68 recognizes the presence of the magenta color frame 48, it will turn off the green light source 62 and turn on the red light source 64. Thus, only the red light beam 65 penetrates through the ink ribbon 42, and the identification device 68 can identify the position of the cyan color frame 50 that follows the magenta color frame 48 by again comparing the output voltage from the optical sensor 66 to the threshold voltage. From this comparison the corresponding position signals are generated. The detailed operating time sequence is described as following:

1. Turn on the green light source 62, detect the output voltage generated by the optical sensor 66, and scroll the ink ribbon 42. When the output voltage goes from low to high the initialization step is complete. These events occur around the time marked t1.
2. Continually scroll the ink ribbon 42 to make the color frames pass by the optical sensor 66. When the ink ribbon 42 moves from the yellow color frame 46 to the magenta 48 with respect to the optical sensor 66, because the green light has a lower penetration rate for the magenta color frame 48, the output voltage will go from high to low. Interpret the output voltage drop as the magenta color frame 48 arrival signal. These events occur around the time marked t2.
3. At time t3, turn on the red light source 64. Since the red light has a higher penetration rate for the magenta color frame 48, the output voltage of the optical sensor 66 will go from low to high. This variation of the output voltage is caused by a change of light source rather than a change of color frame. Hence, the variation of the output voltage will not be regarded by the identification device 68 as a color frame arrival signal.
4. At time t4, turn off the green light source 62. The output voltage of the optical sensor 66 will remain high.
5. When the ink ribbon 42 is moved from the magenta color frame 48 to the cyan one 50 with respect to the optical sensor 66, because the red light has a lower penetration rate for the cyan color frame 50, the output voltage will go from high to low. Interpret the output voltage drop as the cyan color frame 50 arrival signal. These events occur around the time marked t5.
6. At time t6, turn on the green light source 62. The output voltage of the optical sensor 66 will remain low.
7. At time t7, turn off the red light source 64. The output voltage of the optical sensor 66 will remain low.
8. When the ink ribbon 42 shifts from the cyan color frame 50 to the yellow one 46 with respect to the optical sensor 66, the green light beam 63 again penetrates through the yellow color frame 46, and the output voltage of the optical sensor 66 goes from low to high. Interpret the output voltage rise as the yellow color frame 46 arrival signal. These events occur around the time marked t8.
9. An identification cycle has been completed. Follow the same steps 2 through 8 repeatedly.

By the above-mentioned sequence of events, every time a new color frame arrives, the color frame arrival signal is compared to the threshold voltage and interpreted according to the present state of the identification device 68. In this manner, the position of the ink ribbon 42 is identified.

Figure 5:
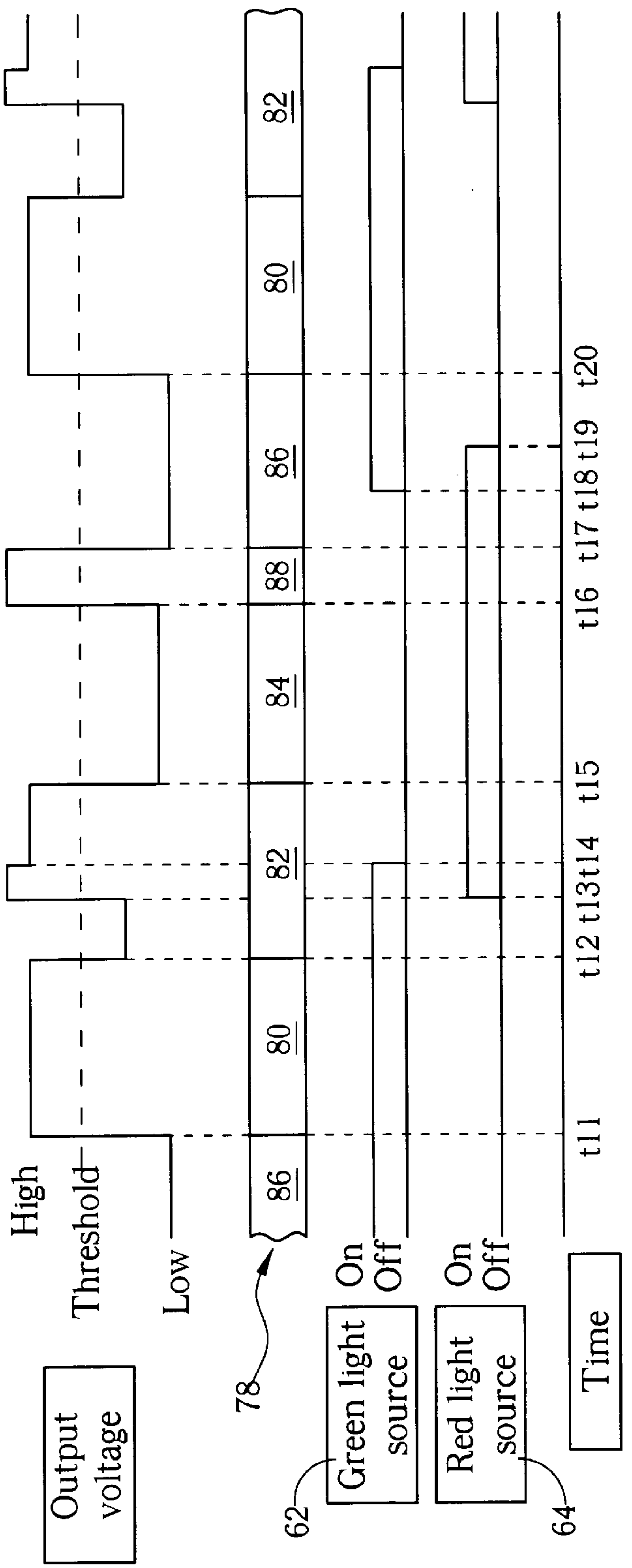
FIG. 5 is a time sequence diagram of a present invention second embodiment according to the ink ribbon positioning system shown in FIG. 2.

Please refer to FIG. 5. FIG. 5 is a time sequence diagram of a present invention second embodiment according to the ink ribbon positioning system 40 shown in FIG. 2. The main difference between this second embodiment to the previous one is the arrangement of the color frames on the ink ribbon. On an ink ribbon 78 used in this embodiment, the color dyes stored in the sequentially arranged color frames 80, 82, 84, and 86 are yellow, magenta, cyan, and black. In addition, there is a blank portion 88 between the cyan frames 84 and the black frame 86. In this second embodiment, the green and red light sources 62, 64 are also used. Green light has a higher penetration rate for the yellow color frame 80 and the blank portion 88; a lower one for the magenta, cyan, and black color frames 82, 84, 86. The red light has a higher penetration rate for the yellow and magenta color frames 80,

82 and the blank portion 88; a lower one for the cyan and black color frames 84, 86. Thus, the identification process can be described as follows:

1. Turn on the green light source 62, scroll the ink ribbon 78, and detect the output voltage generated by the optical sensor 66. When the output voltage goes from low to high, and if the time period that the output voltage remains high is longer than the time period required for the blank portion 88 to shift by, then interpret the output voltage change as the yellow color frame 80 arrival signal. The initialization step is complete. These events occur around the time marked t11.
2. Continually scroll the ink ribbon 78. When the ink ribbon 78 is moved from the yellow color frame 80 to the magenta one 82, because the green light has a lower penetration rate for the magenta color frame 82, the output voltage will go from high to low. Interpret the output voltage drop as the magenta color frame 82 arrival signal. These events occur around the time marked t12.
3. At time t13, turn on the red light source 64. Since the red light has a higher penetration rate for the magenta color frame 82, the output voltage of the optical sensor 66 will go from low to high. This variation of the output voltage is caused by a change in light source rather than a change of color frame, and so the variation of the output voltage will not be regarded by the identification device 68 as a color frame arrival signal.
4. At time t14, turn off the green light source 62. The output voltage of the optical sensor 66 will remain high.
5. When the ink ribbon 78 moves from the magenta color frame 82 to the cyan one 84, because the red light has a lower penetration rate for the cyan color frame 84, the output voltage will go from high to low. Interpret the output voltage drop as the cyan color frame 84 arrival signal. These events occur around the time marked t15.
6. When the ink ribbon 78 moves from the cyan color frame 84 to the blank portion 88, the output voltage goes from low to high. This variation of the output voltage will not be regarded by the identification device 68 as a color frame arrival signal. These events occur around the time marked t16.
7. When the ink ribbon 78 moves from the blank portion 88 to the black color frame 86, the output voltage goes from high to low. Interpret the output voltage drop as the black color frame 86 arrival signal. These events occur around the time marked t17.
8. At time t18, turn on the green light source 62. The output voltage of the optical sensor 66 will remain low.
9. At time t19, turn off the red light source 64. The output voltage of the optical sensor 66 will remain low.
10. When the ink ribbon 78 shifts from the black color frame 86 to the yellow one 80, the green light beam 63 again penetrates through the yellow color frame 80, and the output voltage of the optical sensor 66 goes from low to high. Interpret the output voltage rise as the yellow color frame 80 arrival signal. These events occur around the time marked t20.
11. An identification cycle has been completed. Follow the same steps repeatedly. In this manner, every color frame's arrival signal is obtained so that the position of the ink ribbon 78 can be identified.

In addition, in this second embodiment, because the red light has a higher penetration rate for both the yellow and magenta frames, the blank portion 88 could be replaced by either a yellow color frame or a magenta color frame. What is important is that there is a frame following the cyan frame 84 that the red light can penetrate to make the sensor voltage go high.

Figure 6:
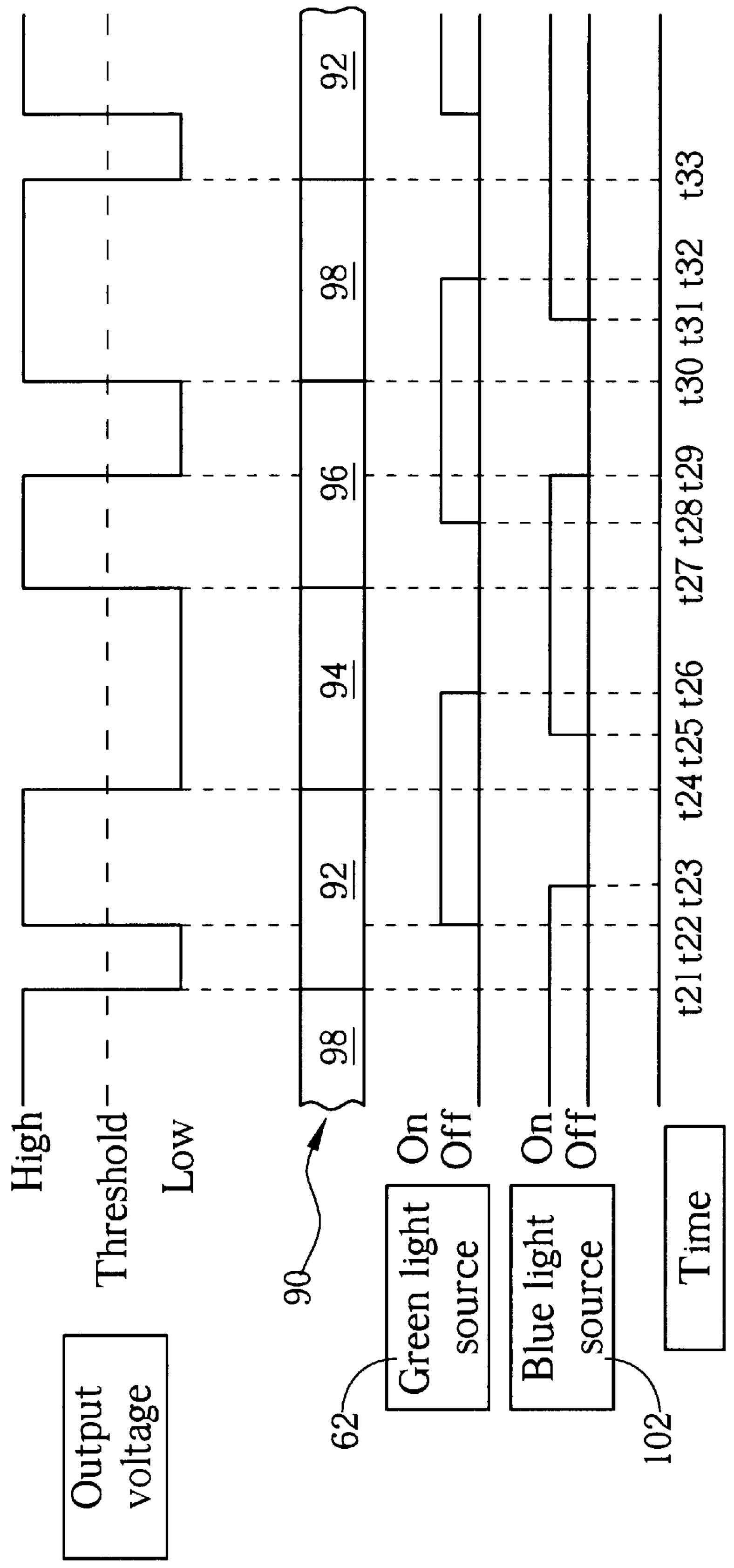
FIG. 6 is a time sequence diagram of a present invention third embodiment according to the ink ribbon positioning system shown in FIG. 2.

Please refer to FIG. 6. FIG. 6 is a time sequence diagram of a present invention third embodiment according to the ink ribbon positioning system 40 shown in FIG. 2. An ink ribbon 90 used in the third embodiment also comprises a plurality of sequentially arranged color frames 92, 94, 96 that store yellow, magenta, and cyan dyes respectively. However, there is an additional overcoating frame 98 that follows the cyan color frame 96. In the third embodiment, green and blue light sources 62, 102 are used. Green light has a higher penetration rate for the yellow color frame 92 and the overcoating frame 98; a lower one for the magenta and cyan color frames 94, 96. Blue light has a higher penetration rate for the cyan color frame 96 and the overcoating frame 98; a lower one for the yellow and magenta color frames 92, 94. Thus, the identification process can be described as follows:

1. Turn on the blue light source 102, detect the output voltage generated by the optical sensor 66, and scroll the ink ribbon 90. When output voltage goes from high to low, interpret the output voltage drop as the yellow color frame 92 arrival signal. The initialization step is then complete. These events occur around the time marked t21.
2. At time t22, turn on the green light source 62, and the output voltage of the optical sensor 66 will go from low to high. This variation of the output voltage is caused by a change of light source rather than a change of color frame, so the variation of the output voltage will not be regarded by the identification device 68 as the color frame arrival signal.
3. At time t23, turn off the blue light source 102. The output voltage of the optical sensor 66 will remain high.
4. When the ink ribbon 90 moves from the yellow color frame 92 to the magenta color frame 94, because the green light has a lower penetration rate for the magenta color frame 94, the output voltage will go from high to low. Interpret the output voltage drop as the magenta color frame 94 arrival signal. These events occur around the time marked t24.
5. At time t25, turn on the blue light source 102. The output voltage of the optical sensor 66 will remain low.
6. At time t26, turn off the green light source 62. The output voltage of the optical sensor 66 will remain low.
7. When the ink ribbon 90 moves from the magenta color frame 94 to the cyan color frame 96, because the blue light has a lower penetration rate for the magenta color frame 94 and a higher one for the cyan color frame 96, the output voltage will go from low to high. Interpret the output voltage rise as the magenta color frame 96 arrival signal. These events occur around the time marked t27.
8. At time t28, turn on the green light source 62. The output voltage of the optical sensor 66 will remain high.
9. At time t29, turn off the blue light source 102. The output voltage of the optical sensor 66 will go from high to low. This variation of the output voltage is caused by a change of light source rather than a change of color frame, so the variation of the output voltage will not be regarded by the identification device 68 as the color frame arrival signal.
10. When the ink ribbon 90 moves from the cyan color frame 96 to the overcoating frame 98, because the green light has a lower penetration rate for the cyan color frame 96 and a higher one for the overcoating frame 98, the output voltage will go from low to high. Interpret the output voltage rise as the overcoating frame 98 arrival signal. These events occur around the time marked t30.
11. At time t31, turn on the blue light source 102. The output voltage of the optical sensor 66 will remain high.
12. At time t32, turn off the green light source 62.

The output voltage of the optical sensor 66 will remain high.

13. When the ink ribbon 90 is scrolled from the overcoating frame 98 to the yellow color frame 92, because the blue light has a higher penetration rate for the overcoating frame 98 and a lower one for the yellow color frame 92, the output voltage of the optical sensor 66 goes from high to low. Interpret the output voltage drop as the yellow color frame 92 arrival signal. These events occur around the time marked t33.
14. An identification cycle has been completed. Follow the same steps repeatedly. In this manner, every color frame's arrival signal is obtained so that the position of the ink ribbon 90 can be identified.

Figure 7:
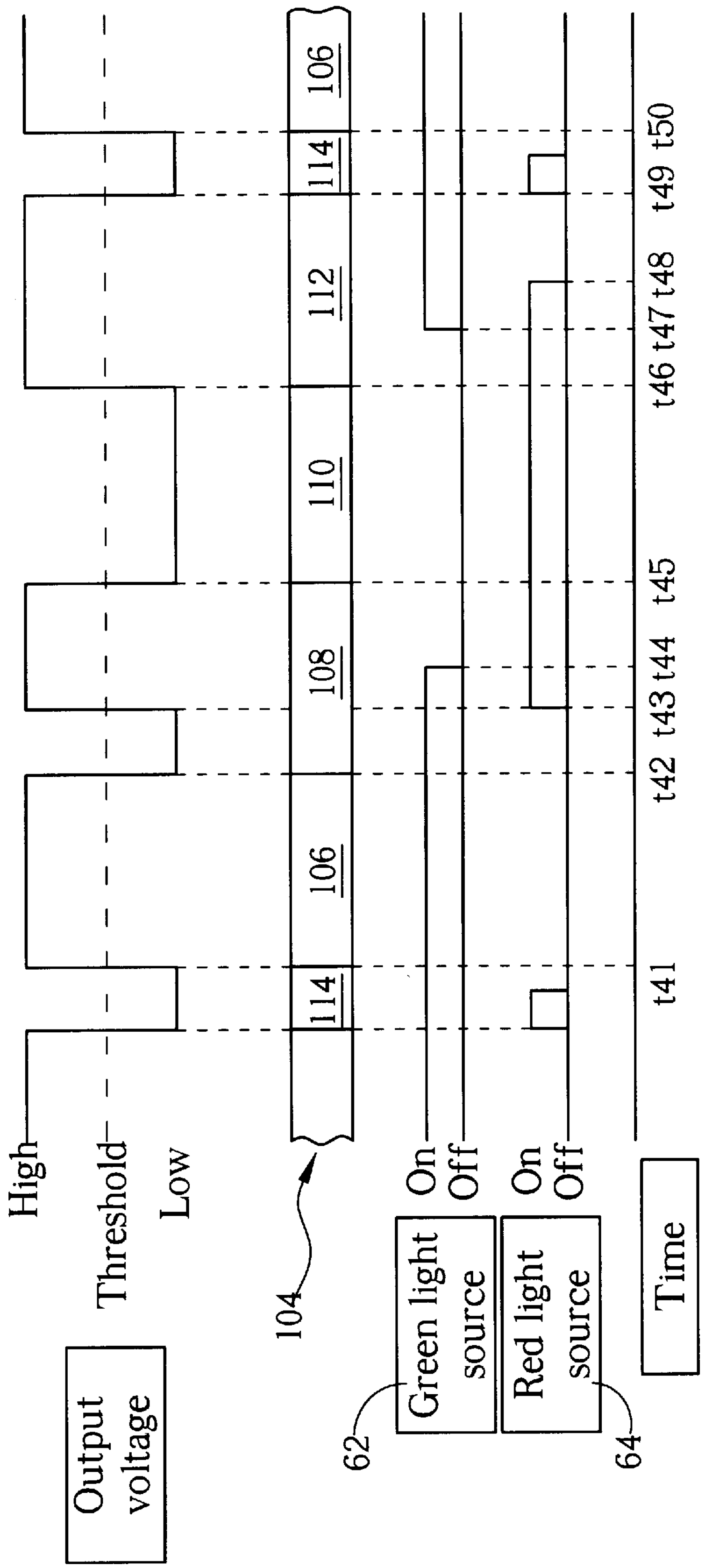
FIG. 7 is a time sequence diagram of a present invention fourth embodiment according to the ink ribbon positioning system shown in FIG. 2.

Please refer to FIG. 7. FIG. 7 is a time sequence diagram of a present invention fourth embodiment according to the ink ribbon positioning system 40 shown in FIG. 2. An ink ribbon 104 used in the fourth embodiment comprises a plurality of sequentially arranged color frames 106, 108, 110 that store yellow, magenta, and cyan dyes respectively, and an overcoating frame 112 following the cyan color frame 110. The difference between this fourth embodiment and the previous third embodiment is that there is an opaque region 114 following the overcoating frame 112. In the fourth embodiment, the green light source 62 and the red light source 64, rather than the expensive blue one, are used. The green light has a higher penetration rate for the yellow color frame 106 and the overcoating frame 112; a lower one for the magenta and cyan color frames 108, 110 and the opaque region 114. The red light has a higher penetration rate for the yellow and magenta color frames 106, 108 and the overcoating frame 112; a lower one for the cyan color frame 110 and the opaque region 114. Thus, the identification process can be described as follows:

1. Turn on the green light source 62, scroll the ink ribbon 104, and detect the output voltage generated by the optical sensor 66. When the output voltage goes from high to low, briefly turn on the red light source 64. If the output voltage remains low then the position of the ink ribbon 104 is in the opaque region 114. The initialization step is then complete. However, if the output voltage goes from low to high when the red light source 64 is briefly turned on, then the position of the ink ribbon 104 is in the magenta color frame 108. The ink ribbon 104 must be scrolled, and the initialization step will be complete when the ink ribbon 104 is in the opaque region 114.
2. When the ink ribbon 104 is scrolled from the opaque region 114 to the yellow color frame 106, the output voltage goes from low to high. Interpret the output voltage rise as the yellow color frame 106 arrival signal. These events occur around the time marked t41.
3. When the ink ribbon 104 is moved from the yellow color frame 106 to the magenta color frame 108, the output voltage goes from high to low. Interpret the output voltage drop as the magenta color frame 108 arrival signal. These events occur around the time marked t42.
4. At time t43, turn on the red light source 64. The output voltage of the optical sensor 66 will go from low to high. This variation of the output voltage is caused by a change of light source rather than a change of color frame, so the variation of the output voltage will not be regarded by the identification device 68 as a color frame arrival signal.
5. At time t44, turn off the green light source 62.

The output voltage of the optical sensor 66 will remain high.

6. When the ink ribbon 104 moves from the magenta color frame 108 to the cyan color frame 110, the output voltage goes from high to low. Interpret the output voltage drop as the cyan color frame 110 arrival signal. These events occur around the time marked t45.
7. When the ink ribbon 104 is moved from the cyan color frame 110 to the overcoating frame 112, the output voltage goes from low to high. Interpret the output voltage rise as the overcoating frame 112 arrival signal. These events occur around the time marked t46.
8. At time t47, turn on the green light source 62. The output voltage of the optical sensor 66 will remain high.
9. At time t48, turn off the red light source 64. The output voltage of the optical sensor 66 will remain high.
10. When the ink ribbon 104 moves from the overcoating frame 112 to the opaque region 114, the output voltage goes from high to low. Interpret the output voltage drop as the opaque region 114 arrival signal. These events occur around the time marked t49.
11. When the ink ribbon 104 is moved from the opaque region 114 to the yellow color frame 106, the output voltage goes from low to high. Interpret the output voltage rise as the yellow color frame 106 arrival signal. These events occur around the time marked t50.
12. An identification cycle has been completed.

Follow the same steps repeatedly. In this manner, every color frame's arrival signal is obtained so that the position of the ink ribbon 104 can be identified.

In addition, in this embodiment, since both the red and green lights have lower penetration rates for the cyan color frame, the opaque region 114 could be replaced by a cyan color frame. In this manner, the production process of the ink ribbon 104 can be simplified and the production cost of the ink ribbon 104 can be lowered. Actually, not only a cyan color frame, but any color or material can be used as the opaque region 114 if both of the light sources have lower penetration rates for the adopted color or material.

Figure 8:
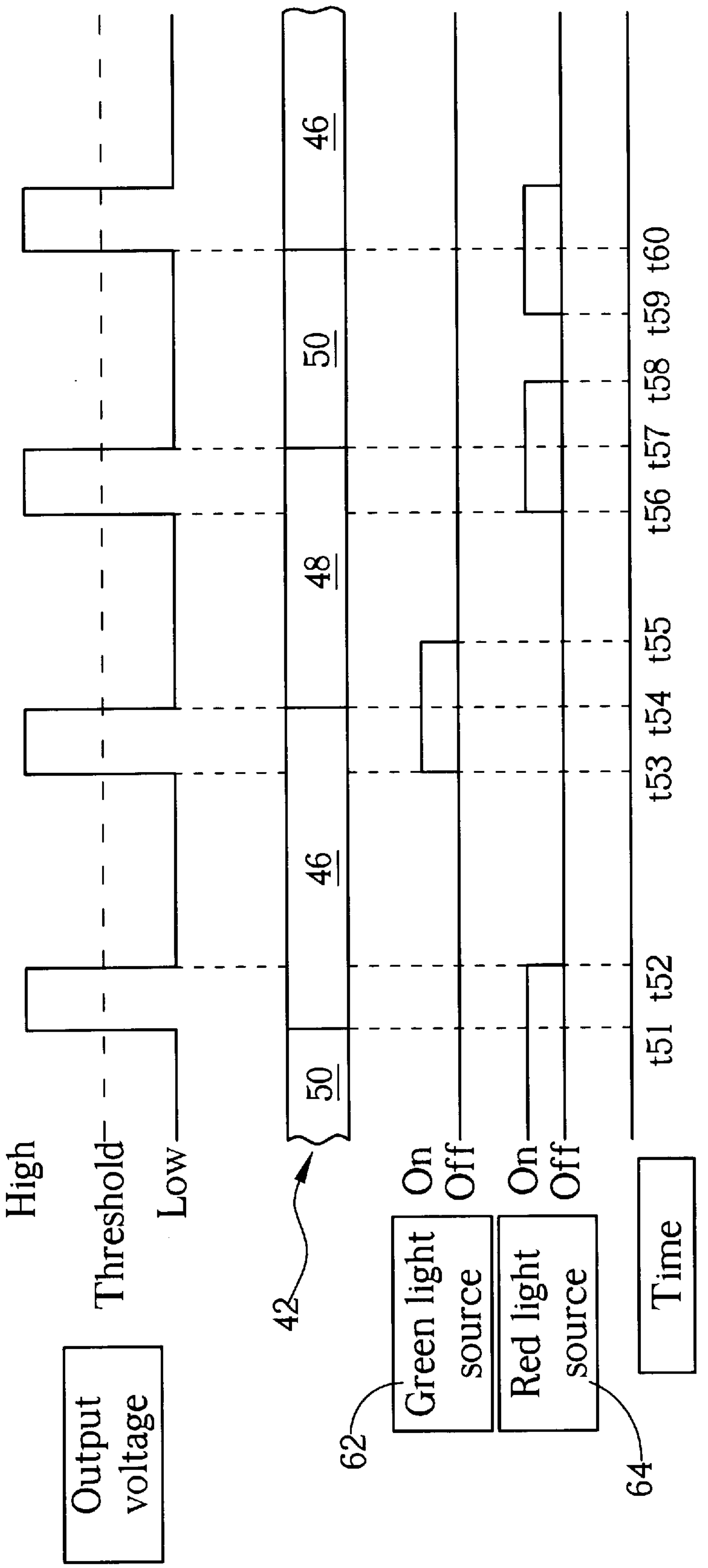
FIG. 8 is a time sequence diagram of a present invention fifth embodiment according to the ink ribbon positioning system shown in FIG. 2.

Please refer to FIG. 8. FIG. 8 is a time sequence diagram of a present invention fifth embodiment according to the ink ribbon positioning system 40 shown in FIG. 2. The ink ribbon 42 used in the fifth embodiment is the same as the one used in the first embodiment shown in FIG. 3, and the green and red light sources 62, 64 are also used in this embodiment. The main difference between this embodiment and the previous embodiments is the initialization step. The initialization step used in the previous embodiments is to find the yellow color frame 46, but the initialization step in the fifth embodiment involves finding the cyan color frame 50 first. When the ink ribbon positioning system is started, the position of the ink ribbon may happen to be in the yellow color frame, and thus the previous embodiments may find an incomplete yellow color frame 46. This embodiment ensures that the yellow color frame 46 found is complete. In addition, in this embodiment, the two light sources 62, 64 are turned on in a non-overlapping matter to save energy and prolong the life of light sources. The green light has a higher penetration rate for the yellow color frame 46; a lower one for the magenta and cyan color frames 48, 50. The red light has a higher penetration rate for the yellow and magenta color frames 46, 48; a lower one for the cyan color frame 50. Thus, the identification process can be described as follows:

1. Turn on the red light source 64, scroll the ink ribbon 42, and detect the output voltage generated by the optical sensor 66. If the output voltage is initially low, then the position of the ink ribbon 42 is in the cyan frame 50. Continually scroll the ink ribbon 42. When the output voltage goes from low to high, the ink ribbon 42 is in the yellow color frame 46 and the initialization step is complete. However, if the output voltage is initially high, then continually scroll the ink ribbon 42; when the output voltage goes from high to low, followed by a low to high, the ink ribbon 42 is then in the yellow color frame 46. These events occur around the time marked t51.

2. At time t52, turn off the red light source 64, and the output voltage of the optical sensor 66 will go from high to low. The variation of the output voltage is caused by a change of light source rather than a change of color frame, so the variation of the output voltage will not be regarded by the identification device 68 as the color frame arrival signal.
3. At time t53, turn on the green light source 62, and the output voltage of the optical sensor 66 will go from low to high. The variation of the output voltage is caused by a change of light source rather than a change of color frame, so the variation of the output voltage will not be regarded by the identification device 68 as the color frame arrival signal.
4. When the ink ribbon 42 is moved from the yellow frame 46 to the magenta color frame 48, the output voltage goes from high to low. Interpret the output voltage drop as the magenta color frame 48 arrival signal. These events occur around the time marked t54.
5. At time t55, turn off the green light source 62. The output voltage of the optical sensor 66 will remain low.
6. At time t56, turn on the red light source 64, and the output voltage of the optical sensor 66 will go from low to high. This variation of the output voltage will not be regarded by the identification device 68 as the color frame arrival signal.
7. When the ink ribbon 42 moves from the magenta frame 48 to the cyan color frame 50, the output voltage goes from high to low. Interpret the output voltage drop as the cyan color frame 50 arrival signal. These events occur around the time marked t57.
8. At time t58, turn off the red light source 64. The output voltage of the optical sensor 66 will remain low.
9. At time t59, turn on the red light source 64. The output voltage of the optical sensor 66 will remain low.
10. When the ink ribbon 42 is moved from the cyan color frame 50 to the yellow color frame 46, the output voltage goes from low to high. Interpret the output voltage rise as the yellow color frame 46 arrival signal. These events occur around the time marked t60.
11. An identification cycle has been completed. Follow the same steps repeatedly. In this manner, every color frame's arrival signal is obtained so that the position of the ink ribbon 42 can be identified.

Figure 9:
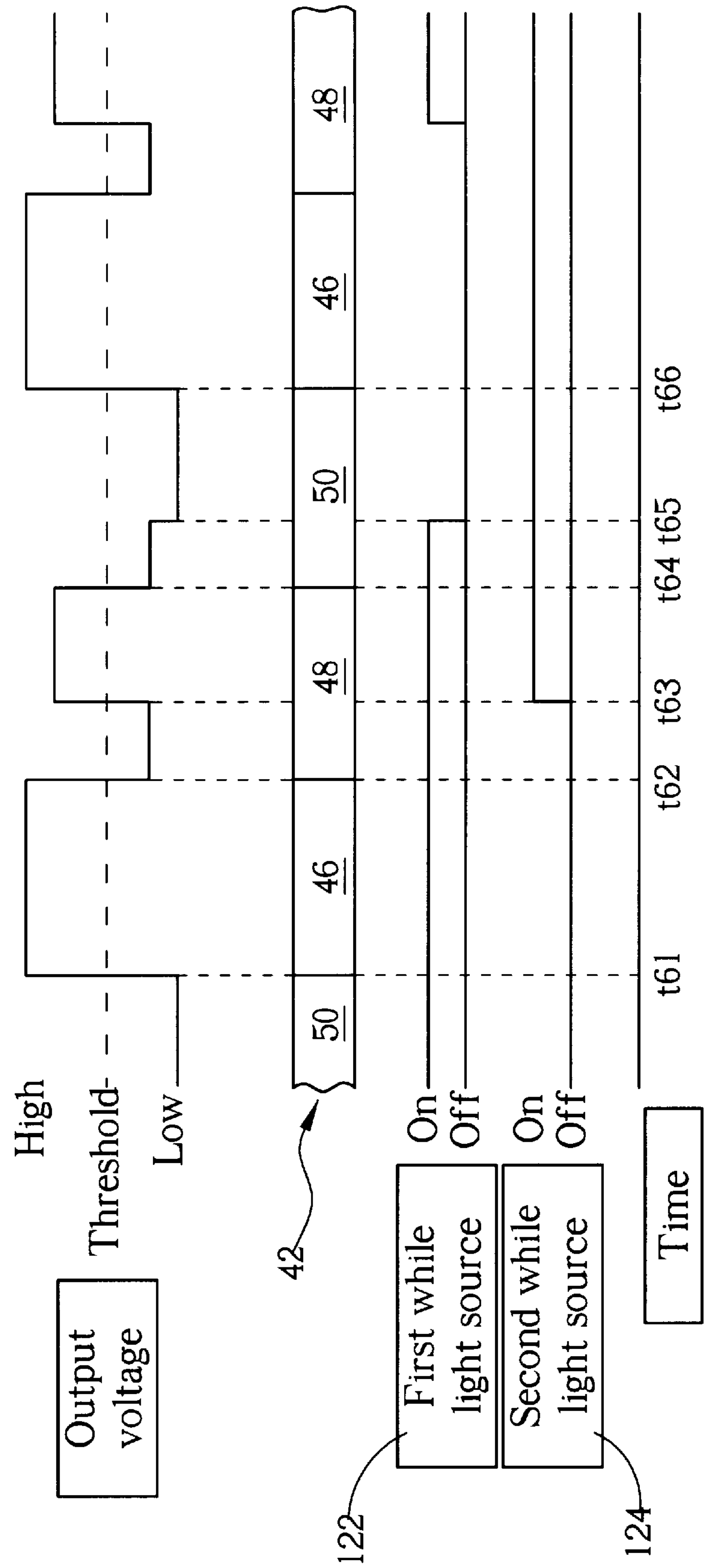
FIG. 9 is a time sequence diagram of a present invention sixth embodiment according to the ink ribbon positioning system shown in FIG. 2.

Please refer to FIG. 9. FIG. 9 is a time sequence diagram of a present invention sixth embodiment according to the ink ribbon positioning system 40 shown in FIG. 2. The different colored light sources of the present invention are replaced by two light sources with the same color. The ink ribbon 42 used in the sixth embodiment is the same as the one used in the first embodiment shown in FIG. 3. A first white light source 122 and a second white light source 124 are used in this embodiment rather than the green and red light sources 62, 64. In the first mode, only one white light source is on, and in the second mode both of the white light sources are on. Consequently, in the first more, the light is of a lower intensity, whereas in the second mode the intensity of the light is higher. Thus, the white light in the first mode has a higher penetration rate for the yellow color frames 46; a lower one for the magenta and cyan color frames 48, 50. The white light in the second mode has a higher penetration rate for the yellow and magenta color frames 46, 48; a lower one for the cyan color frames 50. The identification process can be described as follows:

1. Turn on the first white light source 122, scroll the ink ribbon 42, and detect the output voltage generated by the optical sensor 66. When the output voltage goes from low to high, interpret the output voltage rise as the yellow color frame 46 arrival signal. The initialization step is then complete. These events occur around the time marked t61.
2. When the ink ribbon 42 is moved from the yellow color frame 46 to the magenta color frame 48, because the white light in the first mode has a lower penetration rate for the magenta color frame 48, the output voltage goes from high to low. Interpret the output voltage drop as the magenta color frame 48 arrival signal. These events occur around the time marked t62.
3. At time t63, turn on the second white light source 124. Since the white light in the second mode has a higher penetration rate for the magenta color frame 48, the output voltage of the optical sensor 66 will go from low to high. This variation of the output voltage is caused by a change of mode rather than a change of color frame, so the variation of the output voltage will not be regarded by the identification device 68 as the color frame arrival signal.
4. When the ink ribbon 42 is moved from the magenta color frame 48 to the cyan color frame 50, the output voltage will go from high to low. Interpret the output voltage drop as the cyan color frame 50 arrival signal. These events occur around the time marked t64.
5. At time t65, turn off the first white light source 122. The output voltage of the optical sensor 66 will remain low.
6. When the ink ribbon 42 is moved from the cyan color frame 50 to the yellow color frame 46, the output voltage will go from low to high. Interpret the output voltage rise as the yellow color frame 46 arrival signal. These events occur around the time marked t66.
7. An identification cycle has been completed. Follow the same steps repeatedly. In this manner, every color frame's arrival signal is obtained so that the position of the ink ribbon 42 can be identified.

The sixth embodiment uses two white light sources 122, 124. In fact, a light source of any color that has two operational intensities can achieve the same result. An adjustable red light source, for example, would satisfy this requirement if the red light in the low-intensity mode had a higher penetration rate for the yellow color frames 46; a lower one for the magenta and cyan color frames 48, 50, and the red light in the high-intensity mode had a higher penetration rate for the yellow and magenta color frames 46, 48; a lower one for the cyan color frames 50.

The embodiments mentioned in this invention only describe cases in which the light source and the optical sensor are installed on opposite sides of the ink ribbon. However, the light source and the optical sensor may be installed on the same side of the ribbon if a reflector is installed on the opposite side of the ink ribbon to reflect the light beam emitted from the light source back to the optical sensor for generating output voltages. In addition, in these mentioned embodiments, the ink ribbon may or may not be installed in an ink ribbon cassette, as both types of products can be found in the present market.

Compared with the prior art ink ribbon positioning system, the ink ribbon positioning system 40 only comprises one optical sensor. Thus, the number of components of the color printer is reduced and the production costs are lowered. However, it should be noted that the present invention method identifies the position of the ink ribbon by controlling the luminosity of the light sources at different times, and by detecting the light beams that pass through the ink ribbon. According to the disclosure, more than one optical sensor can surely be used to achieve the same goal.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of identifying various positions of a color ink ribbon of a color printer, the ink ribbon of the color printer comprising a plurality of sequentially arranged color frames for storing different color dyes, a first boundary formed between a first color frame and a second color frame, a second boundary formed between the second color frame and a third color frame, the color printer comprising a thermal print head for printing the color dyes onto an object and a driving device for scrolling the ink ribbon relative to the thermal print head; the method comprising following steps:

(1) emitting a first light beam through the ink ribbon;

(2) detecting a first change of the first light beam penetrating through the ink ribbon when the first boundary moves across the print head;

(3) emitting a second light beam through the ink ribbon;

(4) stopping emitting the first light beam;

(5) detecting a second change of the second light beam penetrating through the ink ribbon when the second boundary moves across the print head;

(6) emitting the first light beam through the ink ribbon; and (7) stopping emitting the second light beam.

2. The method of claim 1 wherein the color dyes stored in first, second, and third color frames are yellow, magenta, and cyan respectively.

3. The method of claim 1 wherein when the first light beam and the second light beam emit through the ink ribbon, an optical sensor generates a corresponding output voltage.

4. The method of claim 3 wherein the method discerns the output voltage generated by the optical sensor according to a predetermined threshold voltage to identify the position of each of the color frames of the ink ribbon.

5. The method of claim 4 wherein a first light source emits the first light beam a second light source emits the second light beam.

6. The method of claim 5 wherein the first light source and the second light source are on a first side of the ink ribbon and the optical sensor is on a second side, and the light beams emitted by the first light source and the second light source penetrate through the ink ribbon, are detected by the optical sensor, and cause the optical sensor to generate the output voltage.

7. The method of claim 5 wherein the first light beam emitted from the first light source is green light, and the second light beam emitted from the second light source is red light.

8. The method of claim 4 wherein the method uses a comparator to compare the output voltage with the threshold voltage and generates comparison signals to identify the position of each color frame of the ink ribbon.

9. The method of claim 1 wherein step 3 is performed after step 4.

10. The method of claim 1 wherein step 4 is performed after step 3.

11. The method of claim 1 wherein step 6 is performed after step 4.

12. The method of claim 1 wherein step 7 is performed after step 4.

* * * * *